United States Patent

Mullaney et al.

Patent Number: 5,525,756
Date of Patent: Jun. 11, 1996

[54] RODENT-PROOF AERIAL SPLICE CLOSURE

[75] Inventors: Julian S. Mullaney; William N. Beauchamp, both of Raleigh; Terry E. Frye, Cary; William K. Heisey; Jack A. Smith, Jr., both of Garner; Thomas H. Wermke, Raleigh, all of N.C.

[73] Assignee: Raychem Corporation, Menlo Park, Calif.

[21] Appl. No.: 439,674

[22] Filed: May 12, 1995

Related U.S. Application Data

[63] Continuation of Ser. No. 203,077, Feb. 28, 1994, abandoned.

[51] Int. Cl.⁶ .......................... H02G 7/06; H02G 15/113
[52] U.S. Cl. .................. 174/92; 171/41; 171/91; 171/93
[58] Field of Search .................. 174/91, 92, 93, 174/41

[56] References Cited

U.S. PATENT DOCUMENTS

| | | | |
|---|---|---|---|
| 1,620,693 | 3/1927 | Royal | 174/92 |
| 1,773,715 | 8/1930 | Austin | 174/91 |
| 2,239,026 | 4/1941 | Wagner | 174/91 |
| 2,978,533 | 4/1961 | Colbert | 174/93 |
| 4,704,499 | 11/1987 | Faust . | |
| 4,721,830 | 1/1988 | Dagan et al. . | |
| 4,859,809 | 8/1989 | Jervis | 174/92 |
| 4,972,167 | 11/1990 | Fujioka | 174/92 |
| 5,247,135 | 9/1993 | Rebers et al. . | |
| 5,322,973 | 6/1994 | Dagan | 174/92 |
| 5,347,084 | 9/1994 | Roney et al. | 174/92 |

FOREIGN PATENT DOCUMENTS

| | | |
|---|---|---|
| 0320236A2 | 6/1989 | European Pat. Off. . |
| 0320189A2 | 6/1989 | European Pat. Off. . |
| 7111934 | 3/1971 | Germany . |
| 1324177 | 7/1973 | United Kingdom . |

OTHER PUBLICATIONS

Bellcore TA–NWT–000950 Issue 2, Dec. 1993.

Primary Examiner—Morris H. Nimmo
Attorney, Agent, or Firm—Herbert G. Burkard; William D. Zahrt, II

[57] ABSTRACT

A rodent-proof aerial splice closure (20) includes a substantially hollow casing (30, 31) having substantial externally exposed plastic areas. The casing sections (30, 31) are moveable with respect to one another on a hinge (35) for accessing the interior of the casing. Clamps (50) provide for reversibly holding the casing sections (30, 31) closed. Cables can enter and exit the closure (20) through cable ports (45), which can be sealed by end-pieces (55). The exterior geometry of the closure (20) is such that substantially all exposed plastic surface regions which are accessible to rodent teeth are rounded with curvatures preferably greater than one inch radii, thus large enough to prevent rodent teeth from biting down thereon.

18 Claims, 8 Drawing Sheets

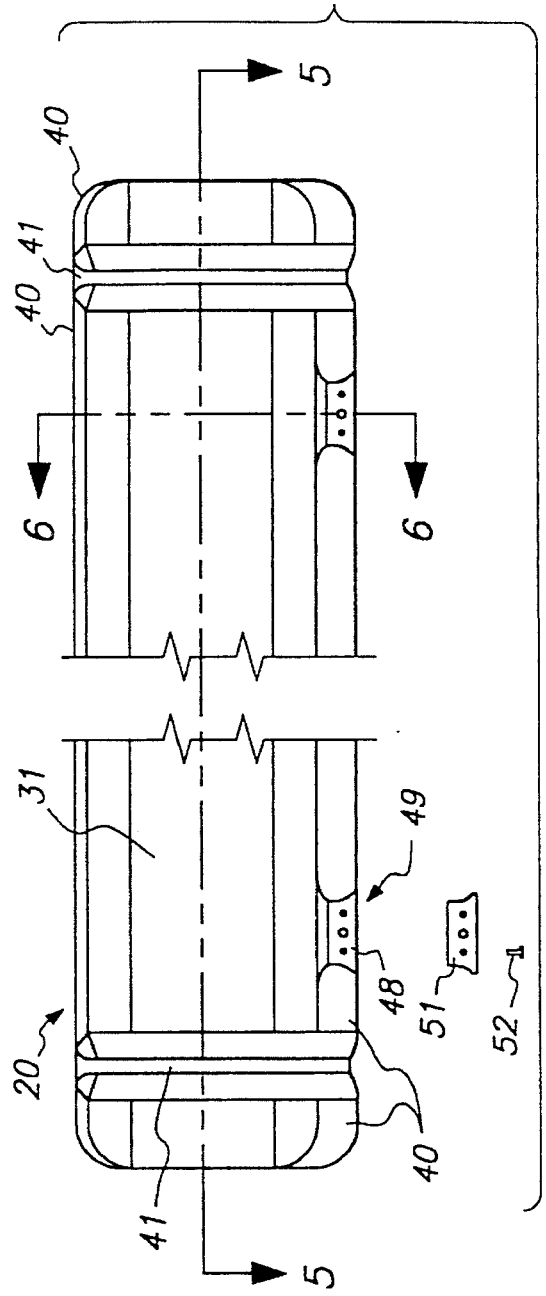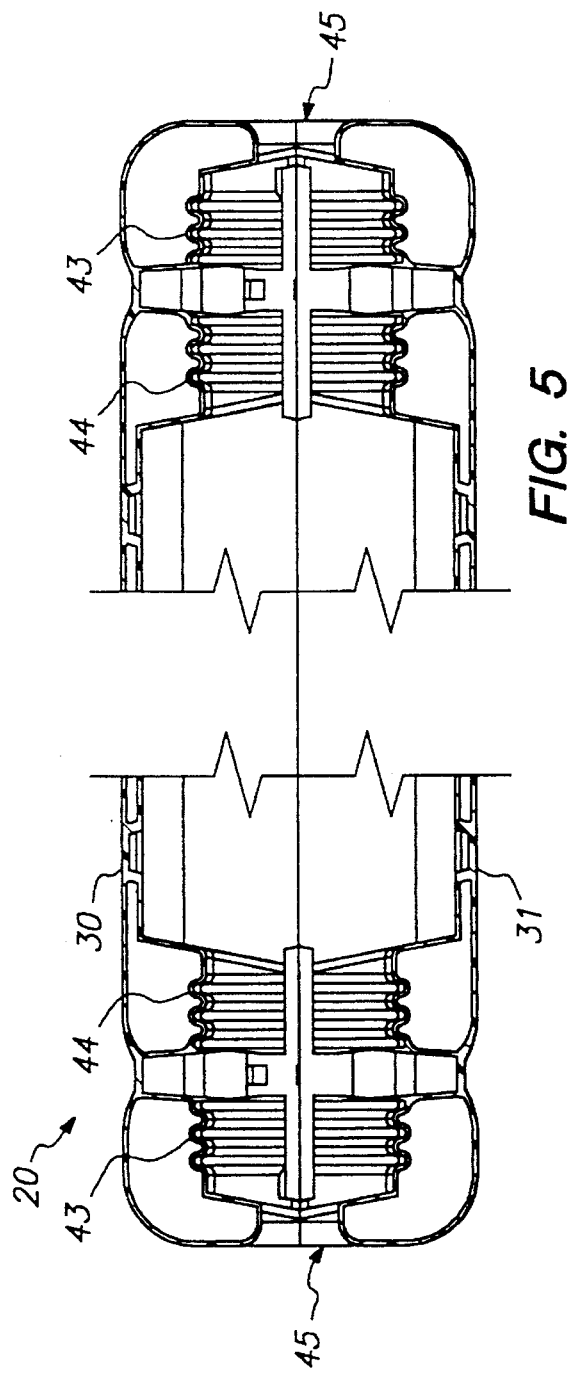

RODENT-PROOF AERIAL SPLICE CLOSURE

This application is a file-wrapper continuation of application Ser. No. 08/203,077 filed Feb. 28, 1994, is now abandoned.

BACKGROUND OF THE INVENTION

The present invention relates to aerial splice closures, and more particularly to splice closures intended for outdoor use in the telecommunications industry, where rodent damage is an ever-present risk.

Rodents are not believed to relish plastic splice closures, nor are they thought to derive much nutritional value from eating them. Nevertheless, they do chew them up, probably due to their continual need to gnaw to keep their incisors shortened. The economic costs from this damage can be enormous, and have stimulated industry studies and proposals for rodent resistance in such closures. For example, Bellcore Technical Advisory TA-NWT-000950, Issue 2, December 1993, titled "Generic Requirements for Optical Network Unit (ONU) Closures" addresses Rodent Resistance in §§5.6.3 and 6.6.3. Among the recommendations for non-metallic closures are that they have "Minimum outside radii of 1 inch" and "Smooth external surfaces with minimum protrusions."

Experience has shown that these are not trivial criteria, especially since practical closures are expected to be re-enterably openable and closeable, must have access ports through which signal cables can enter and exit, and must be sufficiently rugged to withstand brutal weather. So challenging are these criteria that, as presently understood, they are not yet an industry standard. (Bellcore TA-NWT-000950 is an Advisory only.)

A need therefore remains for efficient and effective methods and apparatus which can environmentally protect communication cable splices economically, durably, and reliably, while meeting rodent resistance requirements of the telecommunications industry.

SUMMARY OF THE INVENTION

Briefly, the present invention meets the above needs and purposes with a new and improved rodent-proof aerial splice closure in which the exterior geometry is such that a rodent cannot get hold of any plastic parts to chew on them. Thus, recessed areas are kept so narrow that a rodent cannot get its teeth into those recesses; the distances between such recessed areas are great enough that a rodent cannot bridge across from one to the next with its teeth; and those external surfaces which a rodent can engage with its teeth are either rounded with gentle curvatures, preferably having radii of one inch or more, or are protected by a metallic shield. These criteria are relatively easy to meet on large, smooth body portions. However, in the present invention, these criteria are also satisfied in the critical areas which include the hinge which joins the body sections, the clamps which reversibly hold the body sections together opposite the hinge, and the cable entry ports and end sealing pieces which provide for ingress and egress of cables to and from the closure.

Additionally, the rodent-proof features of the present invention are preserved when it is necessary to enlarge the capacity of the closure by coupling one to another, as is often commercially desirable. Conventionally, closures are enlarged in this fashion by coupling one or more closure casings to one another longitudinally. However, such coupling schemes typically involve mating pieces which are external to the casings and which generate regions on the closure exterior which are vulnerable to rodents. The present invention overcomes this prior art deficiency by physically coupling such casings through their interiors, and restricting external modifications to a very narrow region which is protected externally in a narrow, deep recess which is not accessible to rodent teeth.

It is therefore an object of the present invention to provide new and improved methods and apparatus for rodent-proof aerial splice closures for environmentally protecting communication cable splices, wherein the splice closures include a substantially hollow casing having substantial externally exposed plastic areas, an access portion in the casing which is movable for accessing the interior of the casing from the exterior thereof, reversible attachment means for attaching the access portion on the casing to reversibly close off such access to the casing interior, at least one cable port in the casing for allowing at least one cable to pass through the casing between the interior and exterior thereof, and an exterior geometry such that, when closed, substantially all exposed plastic surface regions which are accessible to rodent teeth are rounded with curvatures having predetermined radii at least large enough to prevent rodent teeth from biting down thereon; in which the cable port may be separate from and in addition to the access portion; in which an end-piece may be receivable in the cable port for closing gaps between such a cable and the casing; in which the curvatures may have radii of at least one inch; in which the casing may be an elongated housing divided longitudinally into at least two sections, a hinge joining the sections, and one of the sections being the access portion; in which the reversible attachment means may be at least one pair of opposable lips on edges of the sections substantially opposite the hinge, and a metallic clamp for engaging the lips on the portions thereof exteriorly exposed when the lips are held together, and for holding the lips together when so engaged; in which the metallic damp, when so engaged, may be at least two metal plates held together by a bolt; in which the hinge may be a web joining the sections smoothly along the exterior surfaces thereof, and including stretch means positioned on the sections to pull the web taut when the access section is moved to close off access to the interior of the casing; in which the stretch means may be engageable abutment surfaces positioned on the interiors of the sections to cause the abutment surfaces to engage to lever the sections incrementally away from one another and thereby pull the web taut when the access section is moved to close off access to the interior of the casing; in which the casing may be blow molded; in which the casing may be double-walled; in which the closure may include a coupler system for extending the closure by joining a plurality of such casings while preserving the exterior rodent-proof geometry; in which the coupler system may include at least one coupler port in each of at least two such casings, and a coupler which can extend through the coupler port on one such casing and through an adjacent such port on another such casing, the coupler having grips thereon for engaging and holding the casings on the insides thereof to couple the casings together internally in such a port-adjacent position without requiting coupling features on the exteriors of the casings; in which the cable port may be the coupler port; in which the coupler may be an end-piece receivable in cable ports in the casings for closing gaps between the casings and cables in the ports; and to accomplish the above objects and purposes in an inexpensive, uncomplicated, durable, versatile, and reliable method and apparatus, inexpensive to manufacture, and readily suited to the widest possible utilization in the telecommunications industry.

BRIEF DESCRIPTION OF THE DRAWINGS

FIG. 3 shows a commercially-available prior art metallic hanger and splice tray assembly intended to be enclosed within the splice closure;

FIG. 4 is a shortened, partially exploded side view of the FIG. 1 closure;

FIG. 5 is a cross-sectional view of the closure taken on line 5—5 in FIG. 4;

DESCRIPTION OF THE PREFERRED EMBODIMENTS

Figure 1:
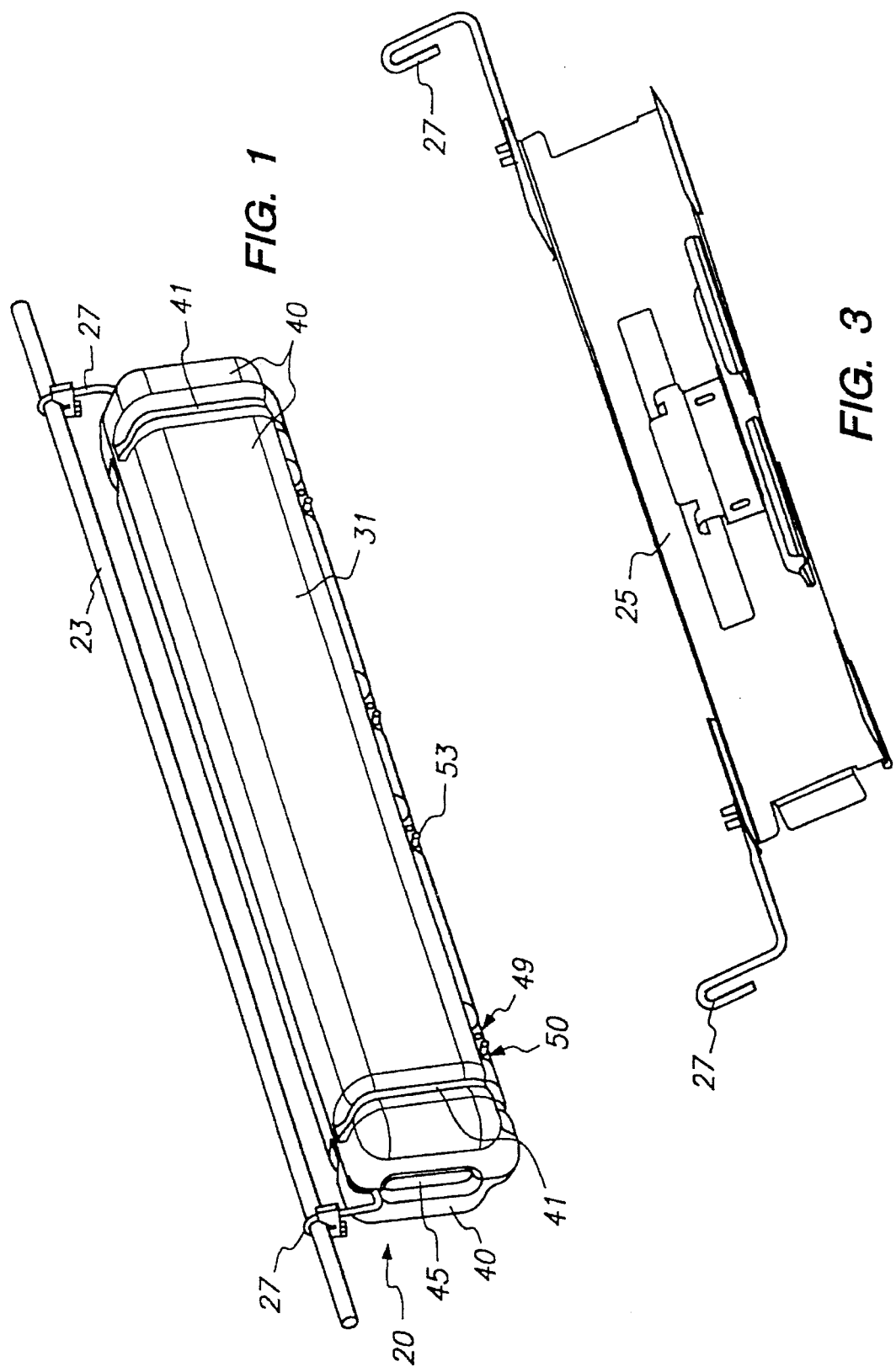
FIG. 1 is a somewhat figurative, perspective illustration of a rodent-proof aerial splice closure according to the present invention installed beneath and suspended from a suitable aerial support cable.
Figure 2:
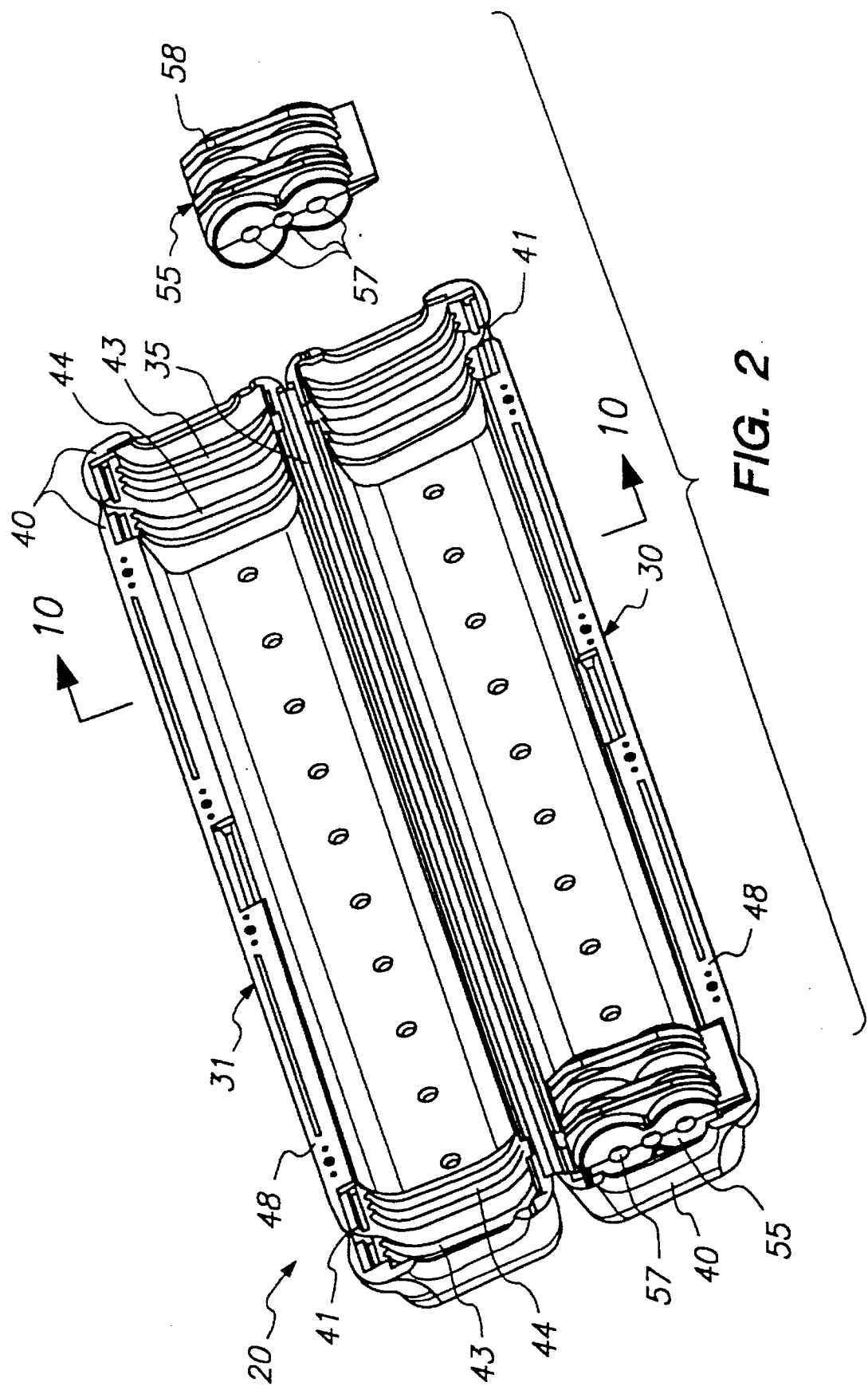
FIG. 2 is a perspective view of the FIG. 1 closure shown in an open position in which the interior thereof is accessible, and showing exploded away therefrom one of the end-pieces.
Figure 6:
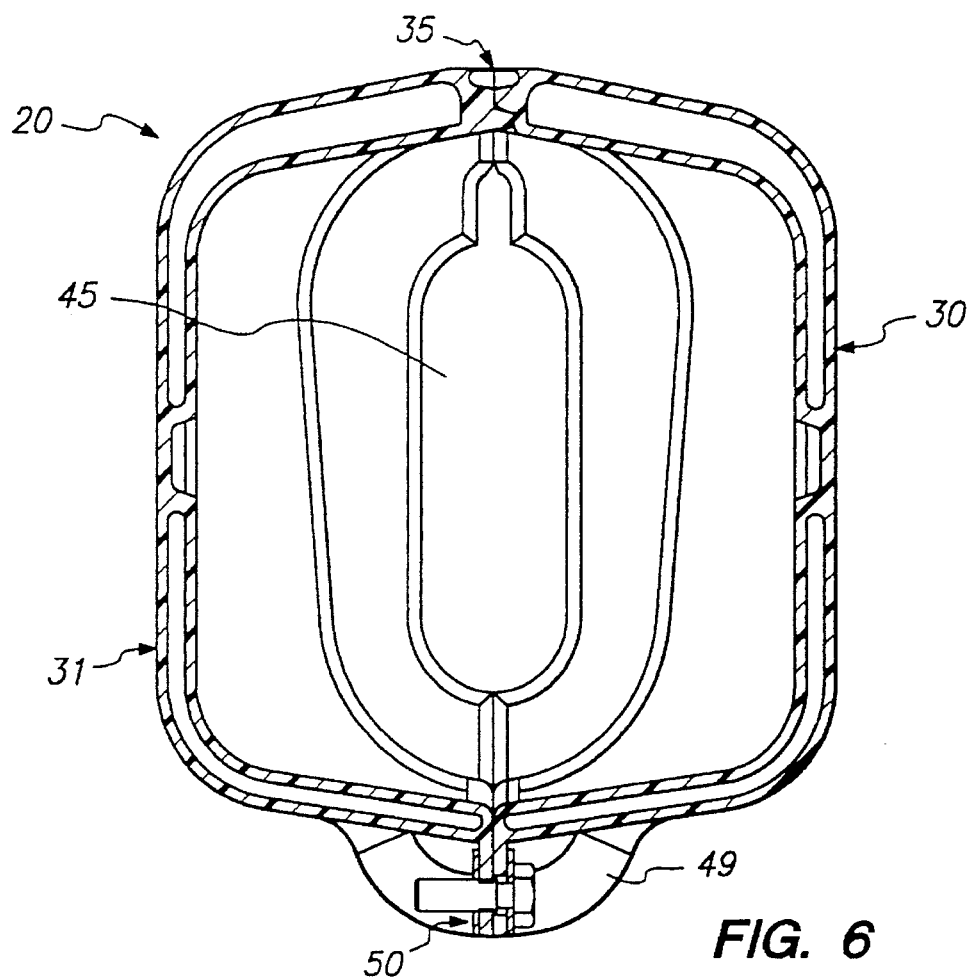
FIG. 6 is a cross-sectional view of the closure taken on line 6—6 in FIG. 4, with the end-piece omitted for clarity of illustration.
Figure 7:
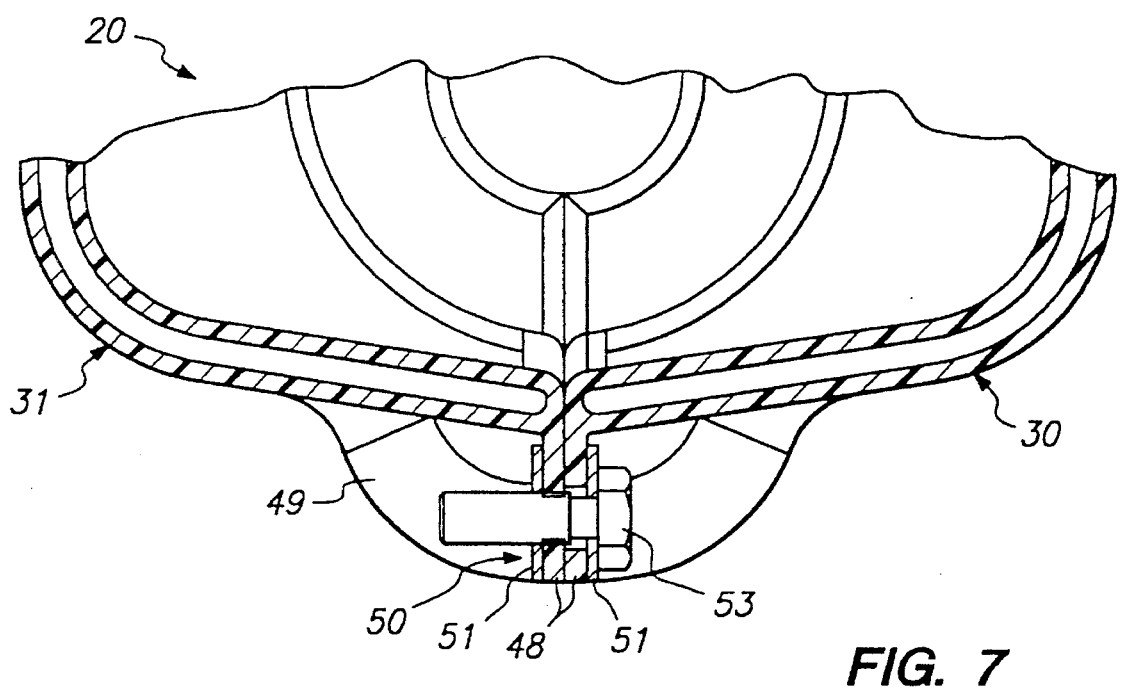
FIG. 7 is an enlarged detail of the lower portion of FIG. 6.

With reference to the drawings, the new and improved rodent-proof aerial splice closure, and the method therefor according to the present invention, will now be described. FIG. 1 shows such a closure 20 installed beneath and suspended from a suitable aerial support cable 23. Closure 20 encloses, for example, a fiber optic splice tray 25 having hanger hooks 27 which project externally from the closure and are secured to cable 23 in known manner. Such a tray and hanger hook assembly may be, for example, one such as is commercially available from Raychem Corporation as part of a splicing system sold under the name "TRAC".

Closure 20 includes two casing sections 30 and 31, which, in the preferred embodiment, are double-walled members formed in a blow molding operation which also forms a hinge 35 joining the two casing sections 30 and 31. Sections 30 and 31 are essentially symmetrical, such that either section can be moved relative to the other for opening the closure to provide access to the interior thereof. For purposes of discussion, section 30 may be considered a stationary section and section 31 a moveable access section, although as indicated, these designations are arbitrary.

In view of this symmetry, therefore, and to simplify the description of the invention, no distinction will be made herein with respect to reference numerals for identical or nearly identical casing members or portions unless considered helpful for clarity of description. Thus, the casing sections 30 and 31 will be seen to each have ends 40 joined to the main casing section body by recessed cut lines or regions 41, on either side of which on the interior of the sections 30, 31 are respective outer receiving grooves and ridges 43 and inner receiving grooves and ridges 44. The section ends 40 have matching openings which, together, provide a cable port 45 in the casing for allowing cables to pass through the casing between the interior and exterior thereof.

Casing section 31, as thus described herein, is an access portion in the casing which is thus moveable for accessing the interior of the casing from the exterior thereof. When moved to the closed position (FIGS. 1 and 4), the edges of the casing sections 30, 31 opposite hinge 35 present smooth mating surfaces or lips 48. As may be seen in the drawings, the exterior surfaces of the casing in the region of lips 48 are smoothly rounded with large radii except in the narrow recesses 49 which are provided for clamps 50 which hold the lips 48 together when the casing is closed. Recesses 49 are spaced far enough from one another that a rodent cannot bridge from one to the next with its teeth, and are each narrow enough that a rodent cannot get its teeth into the recesses to bite the closure, except perhaps where the lips themselves are externally flattened to receive the clamps 50. As indicated, the preferred embodiment of the invention is blow molded, and therefore is a plastic construction. In this one clamp region, however, clamp 50 provides a metallic exterior to protect from rodent teeth. More particularly, clamp plates 51 are shaped to match the exposed lip areas at the bases of the recesses 49, and the plates 51 are riveted to their respective lips 48 by rivets 52. Bolts 53 are then threaded, through the plates 51 to secure the casing sections 30, 31 together in the closed position.

Injection molded plastic, gel-filled end-pieces 55 (also commercially available from Raychem Corporation as part of the "TRAC" splicing system) are received in the cable ports 45 and serve to close gaps between the casing sections 30, 31 and cables (not shown) entering into and exiting from the closure 20, as through channels 57 provided in the end-pieces 55. Grooves and ridges 58 on end-pieces 55 are complementary to and match and mate with the receiving grooves 43 and 44 on the casing sections 30, 31, thus firmly securing the end-pieces 55 in the ends 40 of the closure 20.

Figure 8:
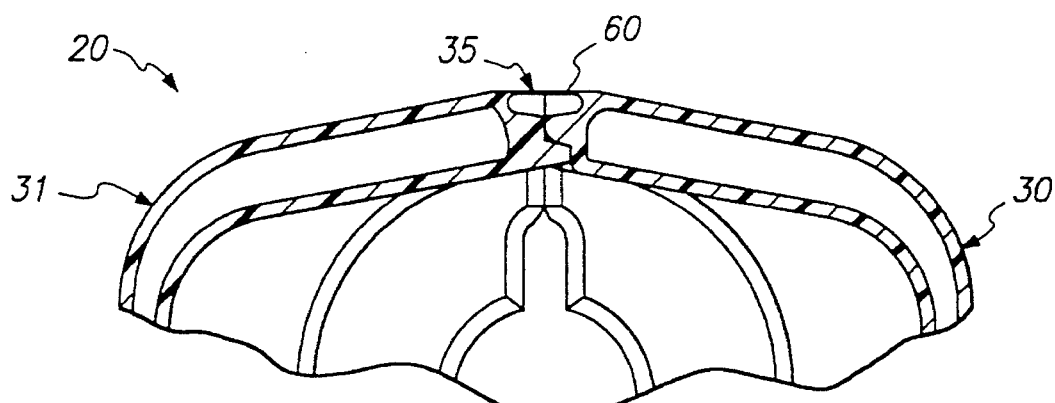
FIG. 8 is an enlarged detail of the upper portion of FIG. 6.
Figure 9:
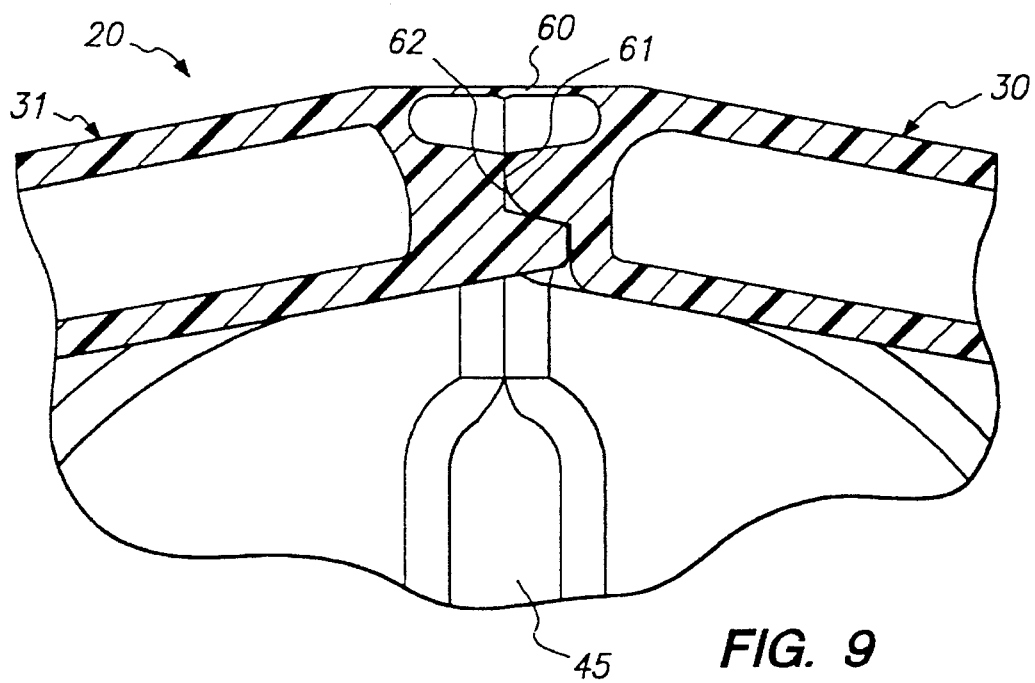
FIG. 9 is an enlarged detail of the upper portion of FIG. 8.
Figure 10:
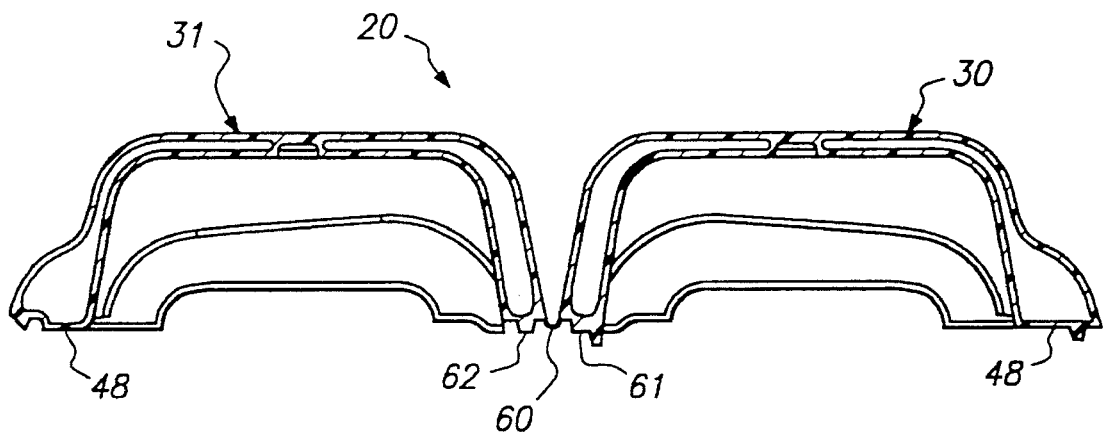
FIG. 10 is a cross-sectional view taken generally on line 10—10 in FIG. 2.

Referring now to FIGS. 8, 9, and 10, the unique, rodent-proof hinge 35 of the present invention will be described. Hinge 35 includes a web 60 which joins casing sections 30, 31 smoothly along the exterior surfaces thereof. Hinge web 60 may have a thickened portion in the middle thereof, if desired, to discourage flexing in that region, for improved hinge longevity. On the interiors of the casing sections, adjacent web 60, are respective engageable abutment surfaces 61 and 62 which are separated from one another when the casing sections are separated and the closure 20 is open. When the sections are rotated around hinge 35 to close the casing, bringing lips 48 together, the abutment surfaces 61 and 62 are likewise engaged. The particular spacing and dimensions of the surfaces 61 and 62 relative to the length of web 60 are such that the effective length of the abutment surface members 61 and 62 is slightly greater than the length of web 60. This causes the abutment surfaces 61 and 62 to lever the casing sections 30 and 31 incrementally away from one another and thereby to pull web 60 taut as the casing sections are moved to close off access to the interior of the closure 20. In this manner, the hinge web 60 continues the smooth exterior profile of the closure 20, thereby preventing rodent teeth from biting the closure in the hinge region.

Figure 11:
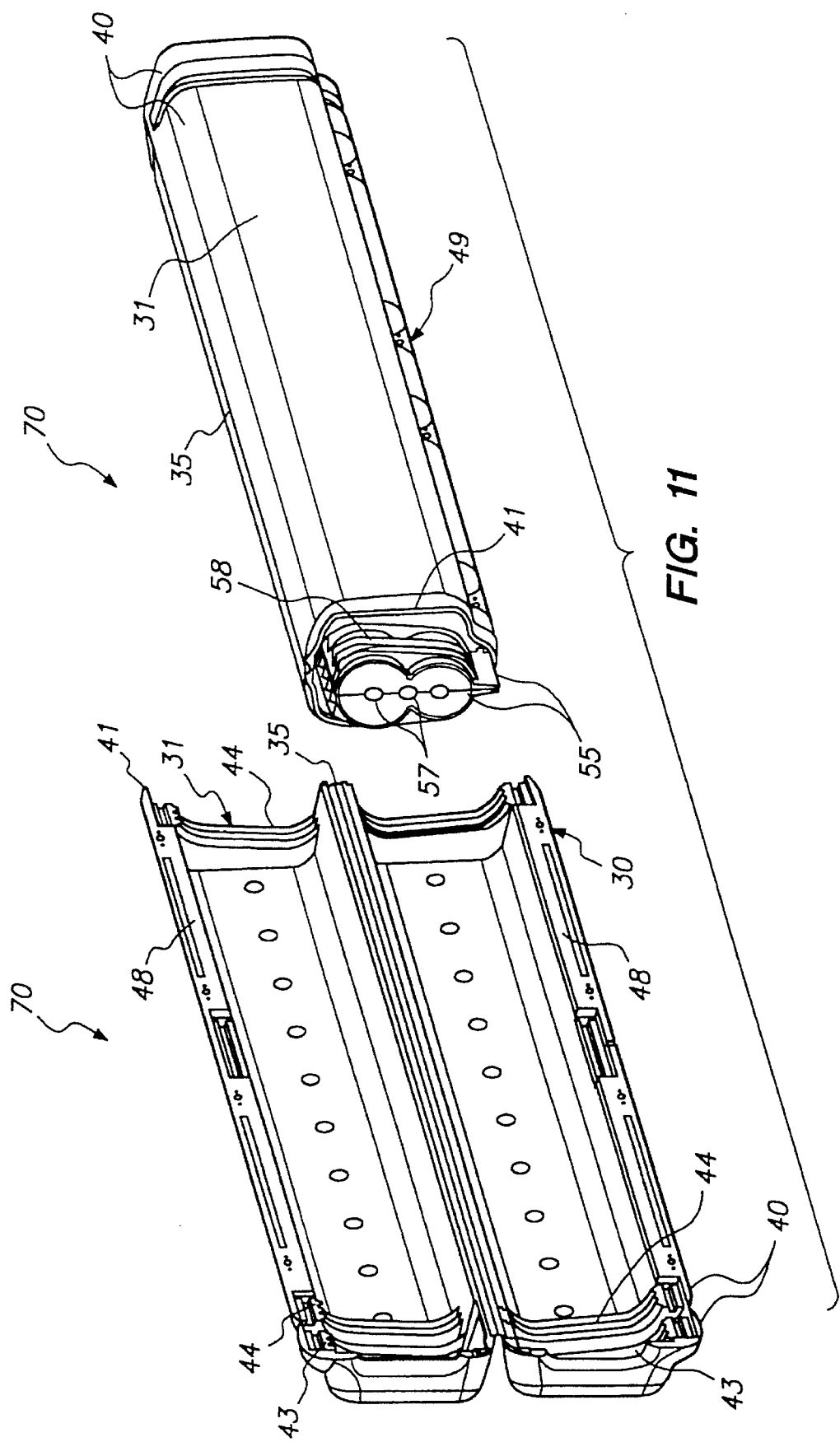
FIGS. 11 and 12 are partially open and closed views, respectively, of an extended closure formed by coupling two casings around a joining end-piece, with portions such as the outer end-piece on the left of each Figure being omitted for clarity of illustration.
Figure 12:
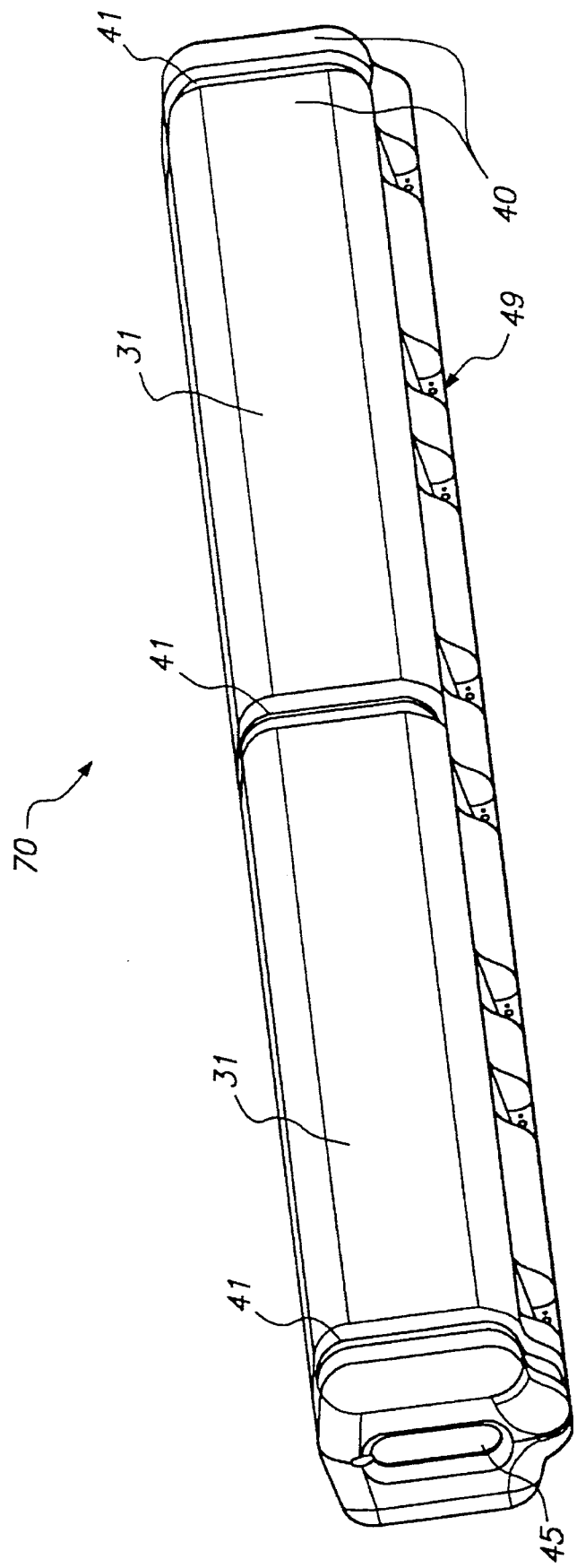
Figure 13:
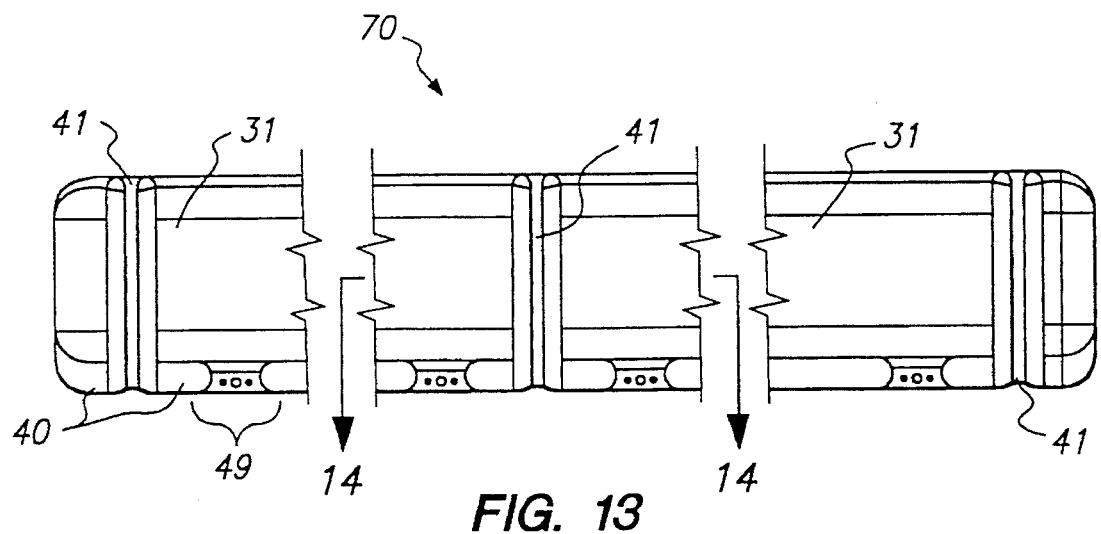
FIG. 13 is a shortened side view of the closure shown in FIGS. 11 and 12.
Figure 14:
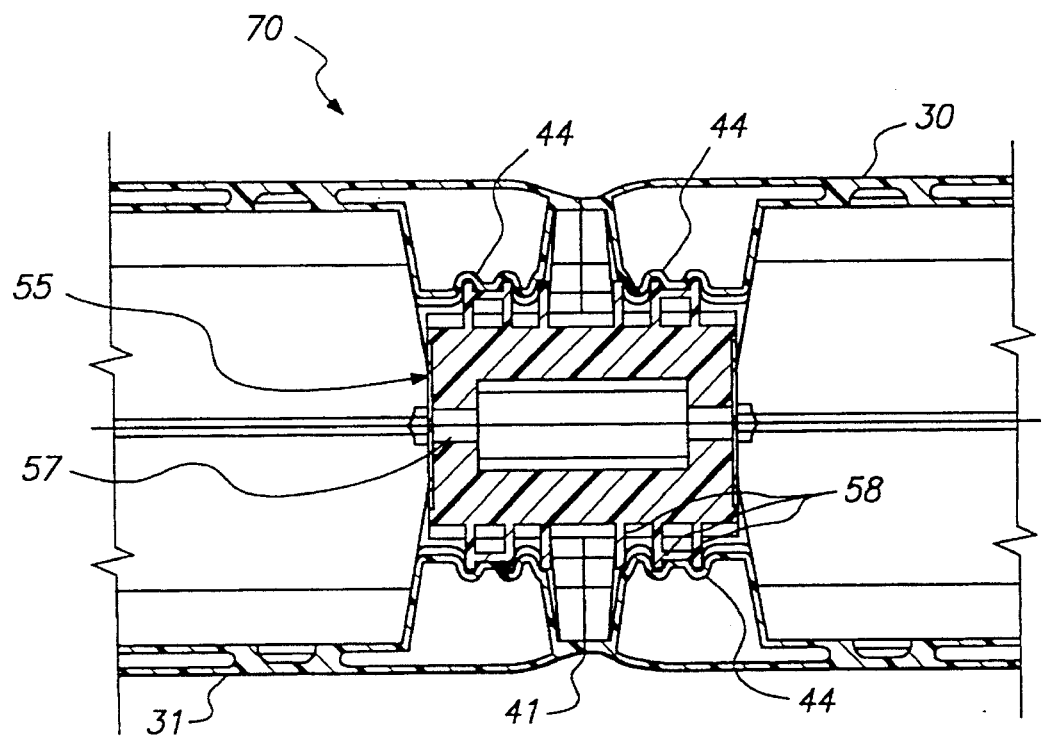
FIG. 14 is a cross-sectional view taken generally on line 14—14 in FIG. 13.

Finally, as may be seen in FIGS. 11–14, the present invention provides a unique coupler system for extending the closure by joining a plurality of the casings while preserving the exterior rodent-proof geometry of the invention. More particularly, to join two or more casings into an extended closure 70, one end 40 is removed from each of two casings by cutting along the recessed cut lines 41 thereof. This removes the outer receiving grooves and ridges 43. The two cut casing ends are then brought into opposing contact, thereby locating the inner receiving grooves and ridges 44 of each casing adjacent one another. The adjacent receiving grooves and ridges 44 physically replicate the earlier ridge and groove pattern of the receiving grooves and ridges 43 and 44 before the former were cut off. Thus, an end-piece 55 can be received in the now adjacent and abutted pair of inner receiving grooves and ridges 44 (FIGS. 11 and 14). As can be seen, the matching end-piece grooves and ridges 58 and receiving grooves and ridges 44 cooperate to furnish internal grips which engage and hold the casings on the insides thereof, thus coupling the casings together internally in this port-adjacent position without requiring coupling features on the exteriors of the casings. Thus, access to rodent teeth in the recessed regions continues to be denied, and those exposed plastic surfaces which are accessible to rodent teeth continue to have curvatures with radii sufficiently large to prevent rodent teeth from biting down thereon.

As may be seen, therefore, the present invention provides numerous advantages. Principally, it meets an important industrial and commercial need by furnishing a rodent-proof aerial splice closure for environmentally protecting communication cable splices. In particular, the preferred embodiment furnishes such an aerial splice closure which can be conveniently re-entered (opened and closed) as often as needed, and can be extended as needed for increasing splice capacity, while still preserving the rodent-proof features. The exterior geometry of the invention is such that substantially all exposed plastic surface regions are either inaccessible to rodent teeth or are rounded with curvatures having radii at least large enough to prevent rodent teeth from biting down thereon.

Claim dependencies have been drafted to comply with PCT Rule 6.4, but it will be understood that, at least by virtue of this paragraph, any appropriate combination of the features disclosed and/or claimed herein is in itself an embodiment of the invention, and it is intended to use multiple dependent claims in the national phase where permitted.

Therefore, while the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. A rodent-proof aerial splice closure for environmentally protecting communication cable splices, comprising:
   a) a substantially hollow casing having substantial externally exposed plastic areas,
   b) an access portion in said casing which is movable for accessing the interior of said casing from the exterior thereof,
   c) reversible attachment means for attaching said access portion on said casing to reversibly close off such access to the casing interior,
   d) means defining at least one cable port in said casing for allowing at least one cable to pass through said casing between the interior and exterior thereof, and
   e) said splice closure having an exterior geometry such that, when closed, substantially all exposed plastic surface regions which are accessible to rodent teeth are rounded with curvatures having predetermined radii at least large enough to prevent rodent teeth from biting down thereon.

2. The closure of claim 1 wherein said cable port is separate from and in addition to said access portion.

3. The closure of claim 2 further comprising an end-piece receivable in said cable port for closing gaps between such a cable and said casing.

4. The closure of claim 1 wherein said curvatures have radii of at least one inch.

5. The closure of claim 1 wherein said casing further comprises an elongated housing divided longitudinally into at least two sections, a hinge joining said sections, and wherein one of said sections is said access portion.

6. The closure of claim 5 wherein said reversible attachment means further comprises:
   a) at least one pair of opposable lips on edges of said sections substantially opposite said hinge, and
   b) a metallic clamp for engaging said lips on the portions thereof exteriorly exposed when said lips are held together, and for holding said lips together when so engaged.

7. The closure of claim 6 wherein said metallic clamp, when so engaged, further comprises at least two metal plates held together by a bolt.

8. The closure of claim 5 wherein said hinge further comprises:
   a) a web joining said sections smoothly along the exterior surfaces thereof, and
   b) stretch means positioned on said sections to pull said web taut when said access section is moved to close off access to the interior of said casing.

9. The closure of claim 8 wherein said web further comprises a thickened portion in the middle thereof to discourage flexing in that region for improved hinge longevity.

10. The closure of claim 8 wherein said stretch means further comprises engageable abutment surfaces positioned on the interiors of said sections to cause said abutment surfaces to engage to lever said sections incrementally away from one another and thereby pull said web taut when said access section is moved to close off access to the interior of said casing.

11. The closure of claim 1 wherein said casing is blow molded.

12. The closure of claim 11 wherein said casing is double-walled.

13. The closure of claim 1 further comprising a coupler system for extending said closure by joining a plurality of said casings while preserving said exterior rodent-proof geometry.

14. The closure of claim 13 wherein said coupler system further comprises:
   means defining at least one coupler port in each of at least two said casings, and
   a) a coupler which can extend through said coupler port on one such casing and through an adjacent such port on another such casing, said coupler having grips thereon for engaging and holding said casings on the insides thereof to couple said casings together internally in such a port-adjacent position without requiring coupling features on the exteriors of said casings.

15. The closure of claim 14 wherein said cable port further comprises said coupler port.

16. The closure of claim 15 wherein said coupler further comprises an end-piece receivable in cable ports in said casings for closing gaps between said casings and cables in said ports.

17. A rodent-proof aerial splice closure for environmentally protecting communication cable splices, comprising:
   a) a substantially hollow, double-walled, blow molded casing having substantial externally exposed plastic areas, said casing being an elongated housing divided longitudinally into at least two sections,
   b) a hinge joining two of said casing sections,
   c) one of said two casing sections being an access portion which is movable relative to the other said section for accessing the interior of said casing from the exterior thereof,
   d) reversible attachment means for attaching said access portion casing section to said other casing section to reversibly close off such access to the casing interior, said reversible attachment means including:
      i) at least one pair of opposable lips on edges of said access and other sections substantially opposite said hinge, and
      ii) a metallic clamp for engaging said lips on the portions thereof exteriorly exposed when said lips are held together, and for holding said lips together when so engaged, said metallic clamp, when so engaged, including at least two metal plates riveted to respective opposed said lips and held together by a bolt,
   e) said hinge including:
      i) a web joining said access and other sections smoothly along the exterior surfaces thereof,
      ii) a thickened portion in the middle of said web to discourage flexing in that region for improved hinge longevity, and
      iii) stretch means positioned on said sections to pull said web taut when said access section is moved to close off access to the interior of said casing, said stretch means including engageable abutment surfaces positioned on the interiors of said sections to cause said abutment surfaces to engage to lever said access and other sections incrementally away from one another and thereby pull said web taut when said access section is moved to close off access to the interior of said casing,
   f) means defining at least one cable port in said casing separate from and in addition to said access portion for allowing at least one cable to pass through said casing between the interior and exterior thereof,
   g) an end-piece receivable in said cable port for closing gaps between such a cable and said casing, and
   h) said splice closure having an exterior geometry such that, when closed, substantially all exposed plastic surface regions which are accessible to rodent teeth are rounded with curvatures having predetermined radii of at least one inch to prevent rodent teeth from biting down thereon.

18. The closure of claim 17 further comprising a coupler system for extending said closure by joining a plurality of said casings while preserving said exterior rodent-proof geometry, wherein said cable ports and said end-piece are dimensioned to extend said end-piece through said cable port on one such casing and through an adjacent such port on another such casing, said end-piece having grips thereon for engaging and holding said casings on the insides thereof to couple said casings together internally in such a port-adjacent position without requiring coupling features on the exteriors of said casings.

* * * * *